United States Patent [19]

Oguro et al.

[11] Patent Number: 5,726,817
[45] Date of Patent: Mar. 10, 1998

[54] MAGNETIC RECORDING AND REPRODUCING APPARATUS AND CLEANING CASSETTE THEREFOR

[75] Inventors: Masaki Oguro, Tokyo; Akira Takano, Kanagawa, both of Japan

[73] Assignee: Sony Corporation, Tokyo, Japan

[21] Appl. No.: 577,327

[22] Filed: Dec. 22, 1995

[30] Foreign Application Priority Data

Dec. 27, 1994 [JP] Japan .................. 6-337841

[51] Int. Cl.⁶ .................................................. G11B 5/02
[52] U.S. Cl. .................. 360/25; 360/69; 360/132
[58] Field of Search ................... 360/128, 69, 94, 360/133, 25, 137, 71; 395/183.01; 364/54, 58

[56] References Cited

U.S. PATENT DOCUMENTS 4,984,120  1/1991  Satoh et al. .................. 360/128
5,088,082  2/1992  Yamada et al. ............... 360/69 X
5,612,827  3/1997  Morita ........................... 360/25

Primary Examiner—Andrew L. Sniezek
Attorney, Agent, or Firm—William S. Frommer; Alvin Sinderbrand

[57] ABSTRACT

A magnetic recording and reproducing apparatus for selectively having a normal cassette containing a recording and reproducing tape or a cleaning cassette containing a cleaning tape loaded therein is provided to detect, for example, on the basis of information stored in a semiconductor memory or an ID board of each cassette, whether the loaded cassette is a normal cassette or a cleaning cassette and, if a cleaning cassette is detected, to limit performance of a cleaning operation to only a predetermined time.

1 Claim, 11 Drawing Sheets

| TERMINAL NO. | ALLOCATION | IDENTIFICATION | RESISTANCE VALUE |
|---|---|---|---|
| P 1 | TAPE THICKNESS | 7 μm | OPEN |
| | | OTHERS | 1,80kΩ 0,09Ω |
| P 2 | TAPE TYPE | ME | OPEN |
| | | RESERVED | 6,80kΩ 0,34Ω |
| | | CLEANING | 1,80kΩ 0,09Ω |
| | | MP | SHORT |
| P 3 | GRADE | VTR FOR INDUSTRIAL USE | OPEN |
| | | VTR FOR BUSINESS USE | 6,80kΩ 0,34Ω |
| | | RESERVED | 1,80kΩ 0,09Ω |
| | | COMPUTER | SHORT |
| P 4 | GND | | |

Fig. 6

| Address | Bank0 MSB ... LSB | |
|---|---|---|
| | 0 | APM / BCID | |
| CASSETTE ID pack | 1 | 0 0 0 0 0 0 0 0 | PC0 |
| | 2 | ME / 1 / 1 / MULTI-BYTES / MEM TYPE | PC1 |
| | 3 | MEM SIZE of SPACE 0 / MEM SIZE of the LAST BANK in SPACE 1 | PC2 |
| | 4 | MEM BANK NO. of SPACE 1 | PC3 |
| | 5 | UNITS of TAPE THICKNESS / 1/10 of TAPE THICKNESS | PC4 |
| TAPE LENGTH pack | 6 | 0 0 0 0 0 0 0 1 | PC0 |
| | 7 | ----------- LSB 1 | PC1 |
| | 8 | ----------TAPE LENGTH---------- | PC2 |
| | 9 | MSB ---------- (binary) ---------- | PC3 |
| | 10 | 1 1 1 1 1 1 1 1 | PC4 |
| TITLE END pack | 11 | 0 0 0 1 1 1 1 1 | PC0 |
| | 12 | ----------- LSB BF | PC1 |
| | 13 | ---------- TAPE LENGTH ---------- | PC2 |
| | 14 | MSB ---------- (binary) ---------- | PC3 |
| | 15 | SR / RE / 1 1 1 1 1 1 | PC4 |

Fig. 7

Bank 0

| Address | MSB ............................. LSB | |
|---|---|---|
| 0 | APM \| BCID | |
| 1 | 0 0 0 0 0 0 0 0 | PC0 |
| 2 | 1 1 1 \| MULTI-BYTES \| MEM TYPE | PC1 |
| 3 | MEM SIZE of SPACE 0 \| UNITS of TPCN | PC2 |
| 4 | HUNDREDS of TPCN \| TENS of TPCN | PC3 |
| 5 | UNITS of TAPE THICKNESS \| 1/10 of TAPE THICKNESS | PC4 |
| 6 | 0 0 0 0 0 0 0 1 | PC0 |
| 7 | ------------------→ 1 (LSB) | PC1 |
| 8 | ------------TAPE LENGTH------------ | PC2 |
| 9 | MSB ◄----------- (binary) ----------- | PC3 |
| 10 | TENS of 1 CLEANING SECONDS \| UNITS of 1 CLEANING SECONDS | PC4 |
| 11 | 0 0 0 1 1 1 1 0 | PC0 |
| 12 | 0 \| TENS of PCNC \| UNITS of PCNC | PC1 |
| 13 | TENS of SECONDS \| UNITS of SECONDS | PC2 |
| 14 | TENS of MINUTES \| UNITS of MINUTES | PC3 |
| 15 | TENS of HOUR \| UNITS of HOUR | PC4 |

CASSETTE ID pack: rows 1–5
TAPE LENGTH pack: rows 6–10
TITLE END pack: rows 11–15

Fig. 9A

CLEANING TAPE PACK

| | MSB | | | | | | | LSB |
|---|---|---|---|---|---|---|---|---|
| P C 0 | 1 | 1 | 1 | 1 | X | X | X | X |
| P C 1 | TENS OF TCN | | | | UNITS OF TCN | | | |
| P C 2 | UNITS OF TPCN | | | | HUNDREDS OF TCN | | | |
| P C 3 | HUNDREDS OF TPCN | | | | TENS OF TPCN | | | |
| P C 4 | TENS OF 1 CLEANING SECONDS | | | | UNITS OF 1 CLEANING SECONDS | | | |

Fig. 9B

TOTAL CLEANING TIME PACK

| | MSB | | | | | | | LSB |
|---|---|---|---|---|---|---|---|---|
| P C 0 | 1 | 1 | 1 | 1 | X | X | X | X |
| P C 1 | TENS OF PCNC | | | | UNITS OF PCNC | | | |
| P C 2 | TENS OF SECONDS | | | | UNITS OF SECONDS | | | |
| P C 3 | TENS OF MINUTES | | | | UNITS OF MINUTES | | | |
| P C 4 | TENS OF HOURS | | | | UNITS OF HOURS | | | |

TCN: TOTAL CLEANING NUMBERS
TPCN: TOTAL POSSIBLE CLEANING NUMBERS
PCNC: POSSIBLE CLEANING NUMBERS IN 1 CLEANING

MAGNETIC RECORDING AND REPRODUCING APPARATUS AND CLEANING CASSETTE THEREFOR

BACKGROUND OF THE INVENTION

1. Field of the Invention

This invention relates of a magnetic recording and reproducing apparatus and to a cleaning cassette for cleaning a head or heads and tape guides of the magnetic recording and reproducing apparatus.

2. Description of the Related Art

In a rotary head type VTR, troubles may arise in the recording or reproducing of an image or sound due to clogging of a head by magnetic powders or the like or by the depositing of nicotine from cigarettes or other tobacco products on tape guide pins or the like. Therefore, cleaning cassettes are commercially available for cleaning the heads or guide pins of VTRs or other magnetic recording and reproducing apparatus. Such cleaning cassettes may include a dry type cleaning tape or a wet type cleaning tape. In the case of a cleaning cassette with a dry type cleaning tape, the head is rubbed by a material, such as, so-called emery cloth, for removing magnetic particles or dust therefrom. In the case of the wet type cleaning tape, the head is polished by a material, such as, toweling, soaked with a cleaning liquid for once again removing particles or dust adhering to the head.

The methods of using the dry type cleaning tape and the wet type cleaning tape are similar. In each case, the cleaning cassette has a housing with a shape similar to that of a normal tape cassette. The cleaning cassette is loaded into a VTR in place of the normal video tape cassette and the cleaning tape is fed or advanced by the VTR in its reproducing or recording mode for a predetermined time of about 10 to 20 seconds. When the cleaning cassette is loaded into the VTR and its cleaning tape is fed as mentioned above, the head and/or guide pin or pins of the VTR are rubbed by the driven cleaning tape so that dust on the heads and/or guide pins are removed or eliminated.

As already mentioned, the dry type cleaning tape is of a material like emery cloth, and the wet type cleaning tape is of a coarse material like toweling soaked with a cleaning liquid. In either case, the cleaning tape is relatively coarse. Therefore, when the cleaning cassette is used, it is necessary to pay careful attention to the cleaning time, that is, the length of time during which the cleaning tape is rubbed against the head or heads. If the cleaning cassette is used for a time longer than a specified cleaning time, the head is abraded and, in extreme cases, this may result in serious damage to the head or heads. Moreover, the material or coarseness of the cleaning tape differs with the company which manufactures the cleaning cassette. Therefore, the cleaning times of several cleaning cassettes may differ from one company to the next at which such cleaning cassettes respectively originate.

In the known cleaning cassettes, the cleaning time is printed or otherwise noted on the cassette casing or on a label affixed thereto. It is intended that the user will make note of the recommended cleaning time and pay attention thereto when using the cleaning cassette in a VTR or other recording and reproducing apparatus. When the recommended cleaning time elapses, the cleaning cassette is replaced by a normal tape cassette, and the VTR is then operated in its playback or reproducing mode to permit monitoring of a reproduced image. If defects are observed in the reproduced image, the normal tape cassette is again replaced by the cleaning cassette and the cleaning operation is repeated. The noted cleaning and reproducing operations are alternately repeated until the quality of the reproduced image indicates that head and guide pin cleaning have been adequately achieved.

Since the head is abraded each time the cleaning cassette is used, the number of repeated uses of the cleaning cassette for achieving adequate cleaning of the head is limited. Further, when the cleaning cassette is used repeatedly, dusts are deposited on, and adhere to the cleaning tape, or the originally relatively coarse surface of the cleaning tape is worn or rendered smooth so that the cleaning effect of the cleaning tape is reduced or extinguished. Therefore, there is also a limitation in respect to the total number of times that the cleaning cassette can be used. Such limitations in the number of times that the cleaning cassette should be used in any one cleaning operation and in the total number of times the cleaning cassette may be used without losing its effectiveness also differ from one manufacturer of cleaning cassettes to the next.

The cleaning tape materials also differ in dependence upon the type of recording or reproducing apparatus for which the cleaning cassette is intended. For example, a magnetic material is more coarsely coated onto a tape of the cleaning cassette for an industrial-use VTR as compared with the tape of a cleaning cassette intended for a business-use VTR. Therefore, the industrial-use cleaning cassette can be repetitively used by rewinding the tape in the casing of the cleaning cassette so long as the number of uses lies within the permissible total number thereof. In the case of a cleaning cassette for a business-use VTR, however, the effectiveness of the cleaning cassette is ordinarily substantially diminished if not substantially exhausted after the full length of the cleaning tape has been used a single time. Furthermore, the tape material of a cleaning cassette for a computer or data streamer differs from the tape material of a cleaning cassette for a VTR.

As mentioned above, prior to using the conventional cleaning cassette, the user must carefully read the instructing notes printed or otherwise applied to the cassette casing and pay attention to the permissible cleaning time for each use, the number of times the cleaning cassette may be used for each cleaning operation, and the total number of times the cleaning cassette may be used. However, there is the possibility that the user may ignore such instructions or may not correctly understand the same, in which case damage to the head or heads of the VTR or other recording and reproducing apparatus may result.

For example, if the user replaces a previously used cleaning cassette with a cleaning cassette of a different kind or originating with a different company, the user may not be aware that the specified cleaning time for the new cleaning cassette is different. In such case, if the new cleaning cassette is used for a period of time longer than the recommended cleaning time therefor, the head or heads may be damaged.

Further, if a user erroneously employs a conventional cleaning cassette as a normal video cassette, serious damage to the head or heads frequently occurs. Since the conventional cleaning cassette has exactly the same shape as the normal video cassette, the user is liable to mistake the cleaning cassette for a normal video cassette and to load it into the VTR and then select the reproducing or play mode. In this case, so long as the user does not become aware of the mistake, the cleaning tape is continuously rubbed against the head or heads. Although no image or sound is produced when the cleaning tape is scanned by the head or heads, the user may not properly infer therefrom that a cleaning tape has been loaded. Rather, the user may firmly believe that a normal video cassette has been loaded and may conclude that the reason why no image or sound is generated is because the VTR has failed or a wire is disconnected. Thus, the user may repeatedly try to reproduce or play back the cleaning tape with the VTR in its reproducing or play back mode with the result that the head or heads suffer undesirable abrading by the cleaning tape.

When a user erroneously assumes a cleaning cassette is a normal video cassette and loads it into a VTR which is then preset to automatically initiate a recording operation at a future time, a tragic result may occur. In such case, the recording operation will likely be initiated at a time when the VTR is unattended so that no one will be aware that a cleaning operation, and not a normal recording operation is being effected. Since the tape length of the normal cleaning cassette corresponds to a running time of about 15 minutes, even in the long-time recording mode, the cleaning tape is fed for a long time, for example, at least as much as 30 minutes or more, under the described circumstances so that serious damage to the head or heads cannot be avoided.

OBJECTS AND SUMMARY OF THE INVENTION

Accordingly, it is an object of the invention to provide a magnetic recording and reproducing apparatus and a cleaning cassette therefor by which the use of the cleaning cassette is simplified and accidental damage to the head or heads of the recording and reproducing apparatus from use of the cleaning cassette can be prevented.

In accordance with an aspect of the invention, a magnetic recording and reproducing apparatus is provided with discriminating means for determining whether a cassette loaded therein is a normal cassette or a cleaning cassette, and control means for controlling operations of the apparatus in a manner such that, when it is judged that the loaded cassette is a cleaning cassette, the cleaning operation is safely executed for a predetermined time by a cleaning tape in such cassette.

In accordance with another aspect of the instruction, a cleaning cassette has information stored therein for indicating to a VTR, when loaded therein, times for which such cassette may be safely used in a cleaning operation.

In the case of a cleaning cassette with a semi-conductor memory (MIC) for use in a digital VTR employing a data-compression system, information for identifying the cassette as a proper cleaning cassette for a respective recording and reproducing apparatus is stored in such semi-conductor memory. In the case of a cleaning cassette without a semi-conductor memory in the cassette (MIC), whether the cassette is a cleaning cassette or not is determined from information provided in an ID board included in the cassette. When it is judged that a cassette loaded in the VTR is a cleaning cassette, the cleaning operation is performed only for a predetermined time appropriate for the respective cleaning cassette and indicated by information stored in the MIC or ID board. Further, execution of the cleaning operation is indicated by a visual display or an audible alarm. Therefore, accidental use of the cleaning cassette for a long time and consequent abrading damage to the head or heads is prevented.

The above, and other objects, features and advantages of the present invention, will become readily apparent from the following detailed description thereof which is to be read in connection with the accompanying drawings.

BRIEF DESCRIPTION OF THE DRAWINGS

FIG. 6 is a schematic diagram which is used for explaining the data stored in the MIC of a normal video cassette intended for use with the VTR of FIG. 4;

FIG. 7 is a schematic diagram similar to that of FIG. 6, but which is used for explaining the data stored in the MIC of the cleaning cassette embodying this invention for use with the VTR shown in FIG. 4;

FIGS. 9A and 9B are schematic diagrams which are used for explaining data that may be recorded in an optional area.

DETAILED DESCRIPTION OF THE PREFERRED EMBODIMENTS

Figure 1C:
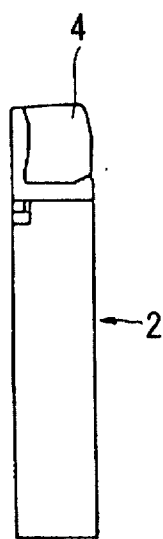
FIGS. 1A, 1B, 1C and 1D are a front view, a bottom view, a side elevational view and a top view, respectively, of a cleaning cassette to which the invention is applied.
Figure 1D:
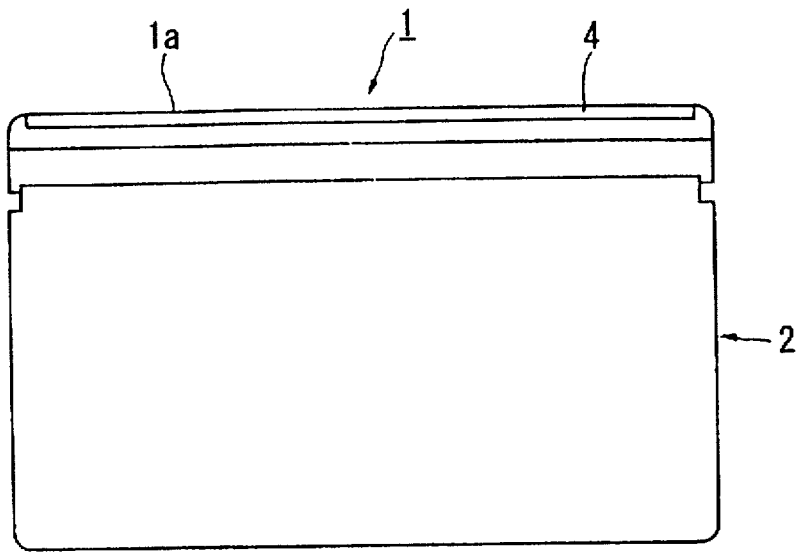

Embodiments of the invention will now be described hereinbelow with reference to the accompanying drawings. FIGS. 1A–1D show an example of a cleaning cassette 1 to which the invention may be applied. The cleaning cassette 1 is intended for use in a digital VTR employing a compression system in which a digital video signal is compressed by a discrete cosine transform (VCT) and variable length encoding and is recorded on a magnetic tape by a rotary head or heads.

The cleaning cassette 1 has a casing 2 with an external configuration similar to that of a video cassette provided for normal use in the digital VTR employing the compression system. Reel access inserting ports 2a and 2b (FIG. 1B) are provided at the bottom of the casing 2, and reels 3a and 3b are arranged within the casing 2 of the cleaning cassette 1 at positions corresponding to the reel access inserting ports 2a and 2b. A cleaning tape T (FIG. 1B) is wound about the reels 3a and 3b and extends therebetween in a path that includes a run directed across the front 1a of the cleaning cassette 1.

A tape protecting shutter or lid 4 extends across the front 1a of the cleaning cassette 1 and is pivotally supported at the opposite side of the cassette casing 2. The lid 4 is pivotally movable between a closed position shown in FIGS. 1A–1D and in which the lid 4 protects the run of the cleaning tape T that is directed laterally across the front of the cleaning cassette, and an opened position (not shown) in which the lid 4 is pivotally raised relative to the cassette casing 2 for exposing the run of the cleaning tape T directed laterally across the then open front of the cassette casing 2. When the cleaning cassette 1 is loaded into a digital VTR, the tape protecting shutter 4 is opened and the cleaning tape directed laterally across the open front of the cassette casing 2 is pulled from the latter similarly to the loading of a normal video tape cassette. When the digital VTR is thereafter set into its reproducing or recording mode, the cleaning tape T is fed between the reels $3a$ and $3b$ and the cleaning tape, while being fed or advanced, is urged into rubbing contact with the head or heads and at least one guide pin of the digital VTR for cleaning the same.

Figure 1A:
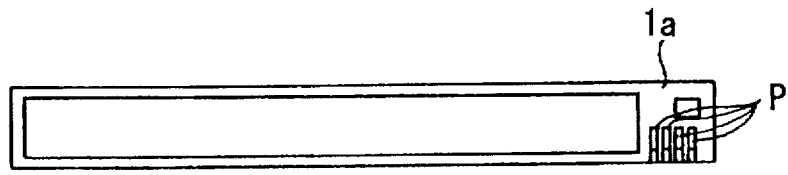
Figure 1B:
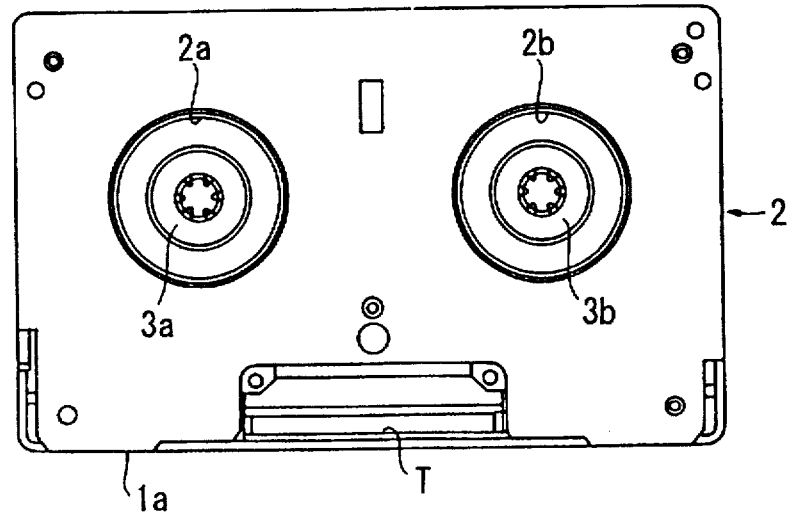
Figures 2, 3:
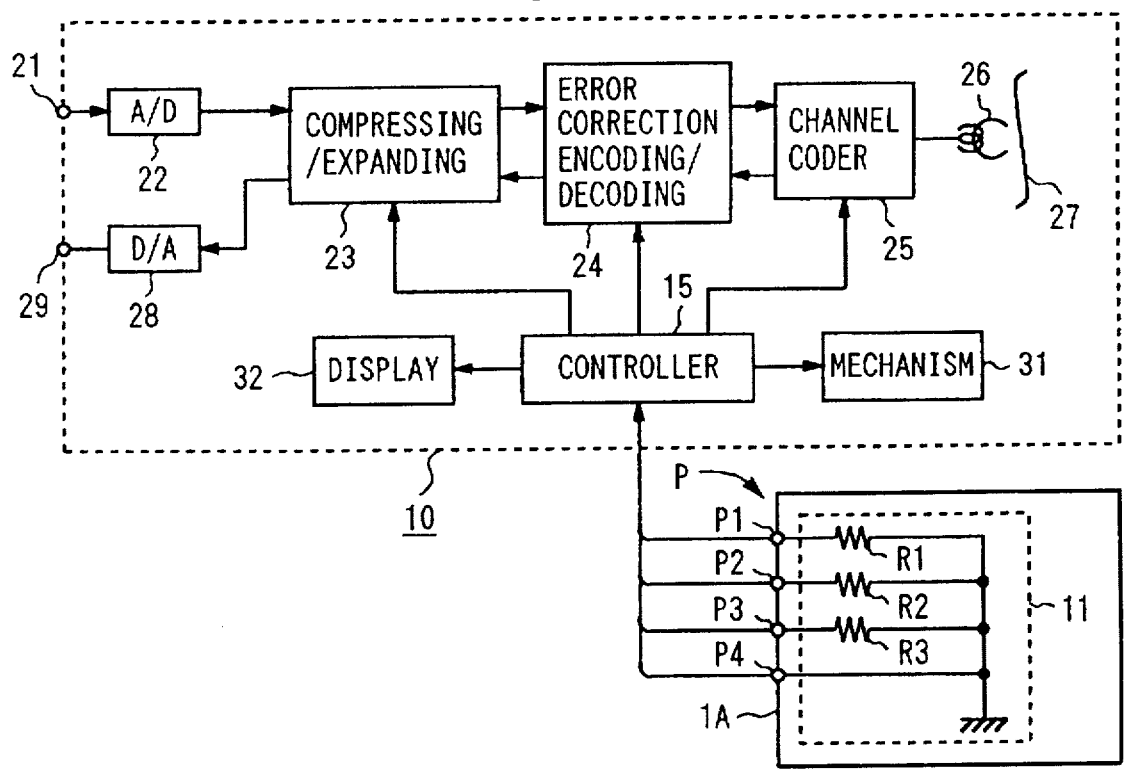
FIG. 2 is a block diagram of a VTR having a cleaning cassette loaded therein in accordance with an embodiment of the invention.
FIG. 3 is a schematic diagram to which reference will be made in explaining the arrangement or format of information provided in the cleaning cassette shown in FIG. 2.
Figure 4:
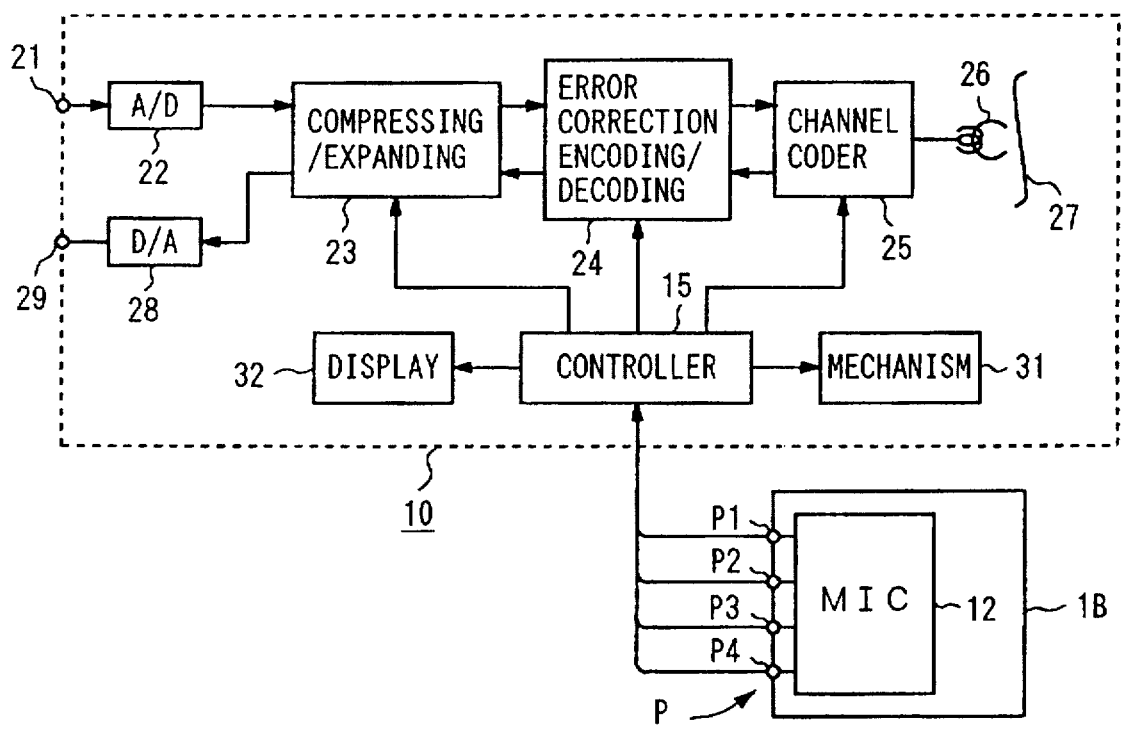
FIG. 4 is a block diagram similar to FIG. 2, but showing a VTR associated with a cleaning cassette according to another embodiment of the invention.

A semi-conductor memory called an ID board, as shown at 11 on FIG. 2, or a so-called memory in cassette (MIC), as shown at 12 on FIG. 4, is built into the cleaning cassette 1A or 1B, respectively. The MIC 12 is used for storing data which indicates the cassette type, the tape thickness, the tape grade and the like, and for storing data representing the title and contents of the recording. In the case of the cassette 1A which does not have an MIC, the ID board 11 is provided instead in order to indicate the tape type, tape thickness, grade of the tape and the like, and operates in a manner similar to the detection holes provided in the casing of the conventional 8 mm videocassette which has been well known. Terminals indicated generally at P on FIG. 1A are provided at one end portion of the front surface $1a$ of the cleaning cassette 1, and are used to connect the control circuits of a digital VTR with the ID board 11 or the MIC 12 in a cleaning cassette 1A or 1B, respectively, loaded in the VTR.

Referring in detail to FIG. 2, it will be seen that, when a cleaning cassette 1A without an MIC, that is, a cleaning cassette having the ID board 11, is loaded into a digital VTR 10, a controller 15 in the VTR 10 detects the resistance values of several resistors included in the ID board 11 and connected to the respective terminals P and thereby obtains respective information as to characteristics of the cassette, such as, tape type, tape thickness, grade of the tape and the like. In the embodiment shown in FIG. 2, four terminals P1–P4 are provided on the cleaning cassette 1A having the ID board 11 which, in this case, includes resistors R1, R2 and R3. The terminal P1 is connected to one end of the resistor R1, the terminal P2 is connected to one end of the resistor R2, and the terminal P3 is connected to one end of the resistor R3. The other ends of the resistors R1, R2 and R3 are connected to the ground which is additionally connected directly to the terminal P4.

The terminals P1, P2 and P3 of the ID board 11 and the values of the resistors R1, R2 and R3, respectively, connected thereto may, for example, have the following meanings as shown on FIG. 3. The terminal P1, that is, the value of the resistor R1 connected thereto, denotes the tape thickness. When the resistor R1 is open or disconnected from the terminal P1, the tape thickness is thereby indicated to be equal to 7 µm. When the value of the resistor R1 lies within the range of 1.80 k$\Omega$±0.09 k$\Omega$, the tape thickness is thereby indicated to be equal to a value other than 7 µm. The terminal P2, that is, the value of the resistor R2, denotes the tape type. When the resistor R2 is open or disconnected from the terminal P2, it is thereby indicated that the tape is an ME (metal evaporated) tape. When the value of the resistor R2 lies within a range of 1.80 k$\Omega$±0.09 k$\Omega$, the tape is indicated to be a cleaning tape. When the resistor R2 is short circuited, it is thereby indicated that the tape is an MP (metal particle) tape. The terminal P3, that is, the value of the resistor R3, denotes the grade of the tape. When the resistor R3 is open or disconnected from the terminal P3, the tape is thereby indicated to be a tape for an industrial-use VTR. When the value of the resistor R3 lies within a range of 6.80 k$\Omega$±0.34 k$\Omega$, the tape is thereby indicated to be a tape for a business-use VTR. When the resistor R3 is short circuited, the tape is thereby indicated to be a tape for a computer or data streamer.

As shown in FIG. 2, when the cleaning cassette 1A is loaded into the digital VTR 10, the ID board 11 of the cleaning cassette 1A and the controller 15 of the digital VTR are connected through the terminals P1–P4 of the cleaning cassette 1A so that the resistance values of the resistors R1, R1 and R3 of the ID board 11 are applied to the controller 15. Thus, information such as tape thickness, tape type, grade of the tape and the like can be identified by the controller 15 in the digital VTR 10. In the embodiment of the invention shown on FIGS. 2 and 3, the information as to the tape type includes, in addition to the selective identification of an ME tape and an MP tape, an indication of whether or not the tape is a cleaning tape.

The controller 15 controls all operations of the VTR 10, and may be constituted by a plurality of microcomputers, such as, a mechanism control microcomputer, a signal processing microcomputer, a mode processing microcomputer, an MIC microcomputer and the like.

In the ordinary recording mode of the digital VTR 10, at which time a normal video tape cassette is loaded in the VTR, a video signal from an input terminal 21 is converted to a digital signal by an A/D converter 22 and is supplied to a compressing/expanding circuit 23. A digital component signal is divided into blocks by the compressing/expanding circuit 23 and is compressed by a DCT and variable length encoding. The resulting signal is error correction encoded by an error correction and coding/decoding circuit 24. The resultant signal is modulated by a channel coder 25 and the compressed digital video signal is recorded on a magnetic tape 27 by a head or heads 26.

In the ordinary reproducing mode of the digital VTR 10, the signal recorded on the magnetic tape 27 is reproduced by the head or heads 26 and then is demodulated by the channel coder 25 and supplied to the error correction encoding/decoding circuit 24. An error correcting process is executed by the error correction encoding/decoding circuit 24, and the resulting output therefrom is supplied to the compressing/expanding circuit 23. A variable length code is decoded by the compressing/expanding circuit 23 and is subjected to an inverted DCT so that it is returned to the form of the digital data before compression. An output of the compressing/expanding circuit 23 is supplied to a D/A converter 28 in which the digital video signal is converted to an analog video signal which is output at a terminal 29.

The operations of the circuits described above with reference to FIG. 2 and the operations of a mechanical portion 31 of the VTR are all controlled by the controller 15. Further, a display signal is generated by a display circuit 32 in response to a suitable signal from the controller 15, and such display signal can provide a corresponding visual signal or alarm, for example, by application of the display signal to an LED or the like.

Ordinarily, for fetching the resistance values of the resistors R1, R2 and R3, voltage values divided by a pull-up resistance and the resistors R1, R2 and R3 in the VTR are A/D converted to respective digital signals which are fed to the MIC microcomputer in the controller 15. Thus, the values fed into the MIC microcomputer are not the resistance values, as such, but rather the corresponding voltage values. The reason the information to be supplied by the ID board 11 is defined by the resistance values of the resistors R1, R2 and R3, as described above with reference to FIG. 3, is that, if measures are taken to prevent an electrostatic breakdown or the like, it is feared that voltage value expressions (rather than resistance values) would not be protected.

In the digital VTR 10 to which the invention is applied, in the case of the cleaning cassette 1A having no MIC, whether the tape is a cleaning tape or not is determined from the information provided by the ID board 11, as mentioned above. In the course of a cleaning operation, when a specified cleaning time has elapsed, the controller 15 causes ejecting of the cleaning cassette, and thereby prevents overlong use of the cleaning cassette with consequent damage to the head or heads.

When the cleaning cassette 1B with the MIC 12 is loaded into the VTR 10, as shown in FIG. 4, the MIC microcomputer of the controller 15 in the digital VTR 10 and the MIC 12 of the cleaning cassette are connected through the terminals P1–P4. In such case, the terminal P1 serves as a power source terminal, the terminal P2 as a serial data terminal, the terminal P3 serves as a serial clock terminal and the terminal P4 serves as a ground terminal. Information or data in the MIC 12 is thus supplied to the controller 15 which, from such information, determines the tape thickness and the tape type. The controller 15 also determines, from information contained in the MIC 12, an optimum cleaning time for each use of the cassette 1B and the number of times the cassette may be used for each cleaning operation with the respective cleaning cassette. Furthermore, the controller 15 detects from information in the MIC 12 the total number of times the respective cleaning cassette has been used and the total accumulated cleaning time or usage of the respective cleaning cassette.

Figure 5:
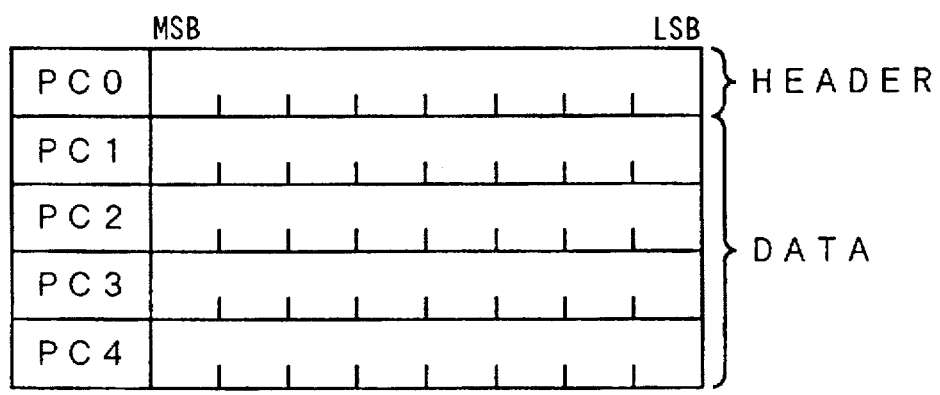
FIG. 5 is a schematic diagram for explaining the format of data in an MIC of the cleaning cassette shown on FIG. 4.

An arrangement of the data in the MIC 12 will now be explained with reference to FIG. 5. The illustrated pack structure is commonly employed for subcode data, AUX data and MIC data and is usually comprised of 5 bytes PC0–PC4. One byte PC0 is a header, and data is arranged in the subsequent four bytes PC1–PC4. By using such pack structure for the data or information stored in the MIC 12, the data extracted from the MIC 12 can be processed by circuits commonly employed for processing subcode data, AUX data and MIC data in the controller 15.

FIG. 6 shows the data structure of an MIC provided in an ordinary video cassette, while FIG. 7 similarly shows the data structure of the MIC 12 provided in the cleaning cassette 1B according to this invention. The fundamental data structures are the same in the MIC in the ordinary video cassette (FIG. 6) and in the cleaning cassette 1B according to this invention (FIG. 7). Of course, in the case of the cleaning cassette, additional information that is peculiar to the cleaning cassette is also stored in the MIC 12.

Figure 8:
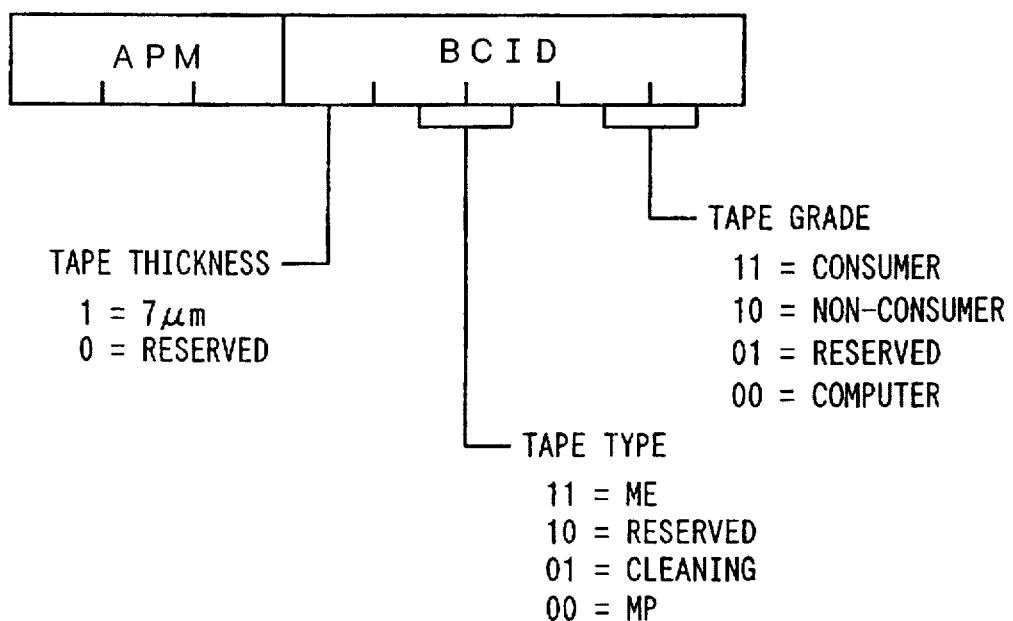
FIG. 8 is a schematic diagram which is used for further explaining a portion of the data shown in FIGS. 6 and 7.
Figure 10:
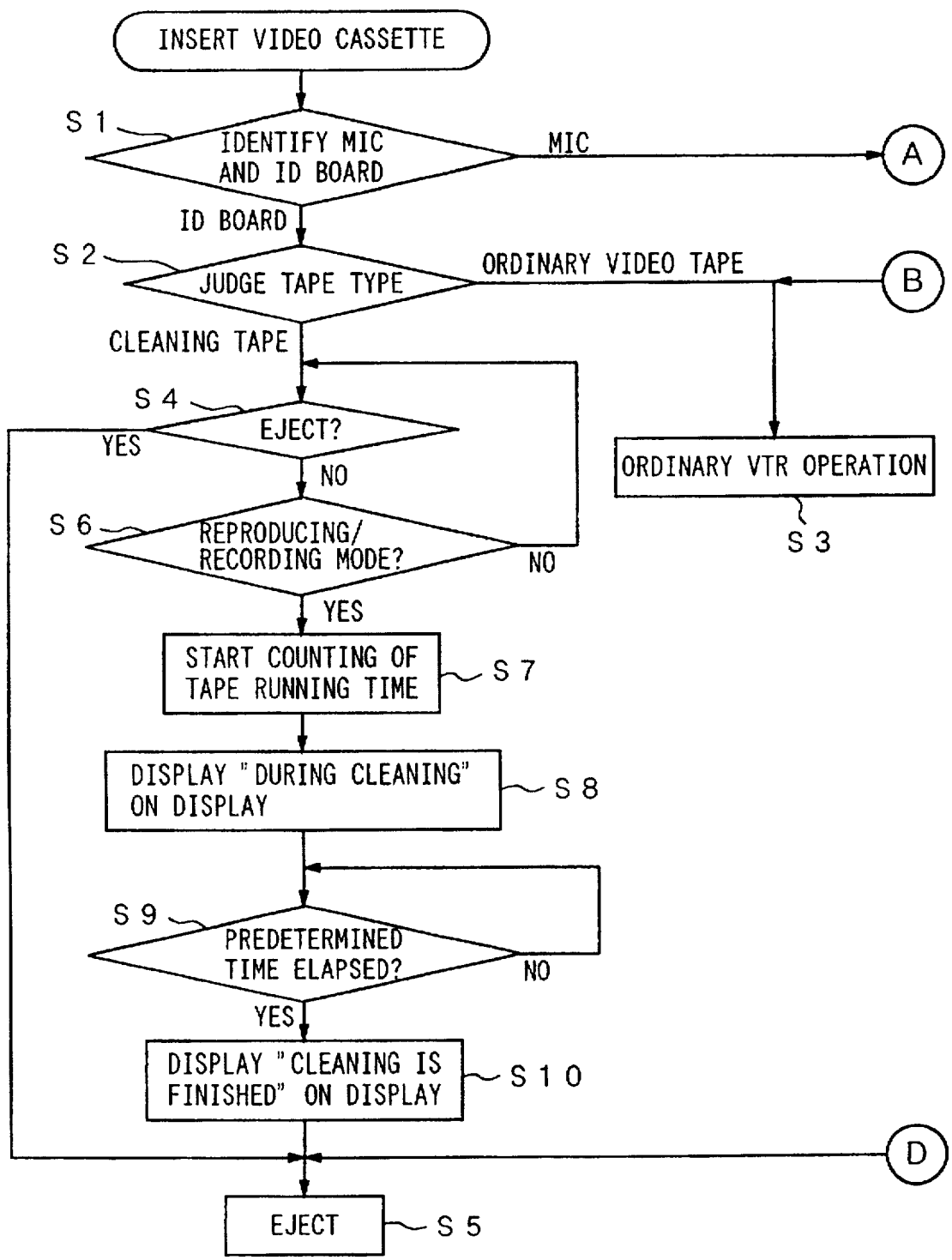
FIGS. 10–13 are flow charts to which reference will be made in explaining operations of a VTR embodying the invention.

As shown in FIGS. 6 and 7, respectively, in both the case of the ordinary video cassette and the case of the cleaning cassette, three bits indicated at APM (Application ID of MIC) and five bits indicated at BCID (Basic Cassette ID) are provided at the head address 0 in the main area. The APM specifies the data structure of the MIC, and the BCID is a basic cassette ID which has the same contents as were described above for the ID board 11 of the cassette 1A which is without an MIC. Thus, as shown in FIG. 8, the tape thickness, tape type and grade of tape can be identified from the data written in the BCID. Further, from the bits of the BCID concerned with the tape type, it can be determined whether or not the tape is a cleaning tape.

After address 0, three packs comprising a cassette ID pack, a tape length pack and a title end pack, respectively, are sequentially arranged in the MIC as shown in FIG. 6 and 7. Those three packs in the main area of the MIC differ slightly from each other in the case of the ordinary video cassette (FIG. 6) and in the case of the cleaning cassette (FIG. 7), respectively.

More particularly, as shown in FIGS. 6, in the ordinary video cassette, information (PC2 and PC3) regarding a space 1 is provided in the cassette ID pack. Since an item regarding such space 1 is unnecessary in the MIC of the cleaning cassette, the number (TPCN) indicating the total possible number of times the cleaning cassette can be used is indicated in units, tens and hundreds at the portions PC2 and PC3 of the cassette ID pack of the MIC in the cleaning cassette, as shown on FIG. 7.

In the MIC of the ordinary video cassette, as shown in FIG. 6, PC4 in the tape length pack is set to "all 1" and is empty. On the other hand, in the MIC of the cleaning cassette, as shown in FIG. 7, the optimum cleaning time for each time the cleaning cassette is used is indicated in tens and units of seconds at PC4 of the tape length pack.

Further, in the cleaning cassette the title end pack of the MIC has a header different from that used in the ordinary video cassette. More specifically, as shown in FIG. 6, in the case of the ordinary video cassette, PC0 of the title end pack indicates "1Fh" (in which h denotes the hexadecimal notation). However, as shown in FIG. 7, in the case of the cleaning cassette, PC0 of the title end pack indicates "1Eh". In the case of the normal video cassette (FIG. 6), an absolute track number is stored in the title end pack which has "1Fh" as its header. On the contrary, as shown in FIG. 7, in the title end pack for the cleaning cassette in which the header is "1Eh", the number of times (PCNC) the cleaning cassette may be used in one cleaning operation is stored in units and tens at PC1, and the total accumulated cleaning time or use of the cleaning cassette is stored in units and tens of seconds, minutes and hours at PC2, PC3 and PC4. In the case of the cassette 1B having the MIC12, as shown in FIG. 8, whether the loaded cassette is an ordinary video cassette or a cleaning cassette can be determined by checking whether or not the indication of the tape type in the BCID is set to "01" or by checking whether the value of address 11, that is, the header of the title end pack, is equal to "1Fh" or "1Eh".

It will be apparent from the above that, in the case of the cleaning cassette having the MIC 12 in accordance with this invention, whether or not a loaded cassette is a cleaning cassette can be readily identified from the data of the MIC 12. Further, the permissible cleaning time for each time the cleaning cassette is used, the number of times the cleaning cassette may be used for each cleaning operation, the total possible cleaning time and the total accumulated cleaning time are all stored in the MIC 12. By reading out and using such stored information, optimum use of the cleaning tape can be achieved consistent with the characteristics of each cleaning tape, and possible damage to the head or heads of the VTR can be avoided.

The maker's optional area of the MIC can also be used for storing unique information regarding the cleaning cassette. For example, as shown in FIG. 9A, a cleaning tape pack may be provided in the optional area for indicating at PC1 and PC2, in units, tens and hundreds, the total number of times that the cleaning cassette has been used (TCN), for indicating at at PC2 and PC3, in units, tens and hundreds, the total possible number of times the cassette can be used for cleaning (TPCN), and for indicating, at PC4, in units and tens of seconds, the maximum cleaning, use of the cleaning cassette at PC4.

Similarly, as shown in FIG. 9B, a total cleaning time pack may be provided in the maker's optional area for indicating, at PC1, in units and tens, the PCNC, that is, the permissible number of times the cleaning cassette can be used for each cleaning operation. Further, as shown in FIG. 9B, at PC2, PC3 and PC4 of the optional area of the MIC, there may be indicated in units and tens of seconds, minutes and hours, the total amount of time that the associated cleaning cassette may be used.

The operations of the VTR 10 in accordance with the present invention will now be described specifically with reference to the flow charts of FIGS. 10–13.

The operating program is initiated in response to the insertion of a video cassette into the VTR and, in response to such initiation of the program, a check is performed in step S1 to determined if the loaded cassette is a cassette 1A provided with an ID board 11 or a cassette 1B having an MIC 12. In the case of a cassette 1A without an MIC, the tape type is judged in step S2 from the information in the associated ID board 11. More specifically, the information as to the type of tape is derived from the resistance value of the resistor R2 connected to the terminal P2.

When it is determined in step S2 that the loaded cassette is an ordinary video cassette, ordinary VTR operations, such as, recording or reproducing operations as previously described, are executed in step S3. On the other hand, if it is judged in step S2 that the loaded cassette is a cleaning cassette, then it is determined in step S4 whether or not the VTR has been set to its ejecting mode. If it is determined in step S4 that the VTR is set to its ejecting mode, the program proceeds to step S5 in which the cleaning cassette is ejected. On the other hand, if it is determined in step S4 that the VTR is not set in its ejecting mode, then it is checked in step S6 whether or not the VTR has been set to its recording or reproducing mode. If the VTR is not set to its recording or reproducing mode, the routine is returned from step S6 to step S4. However, if the VTR is found to be set in its recording or reproducing mode in step S6, advancement or running of the cleaning tape is initiated and counting of the tape running time is started in step S7. During the running of the tape in the cleaning cassette, a suitable warning signal is generated in step S8, for example, corresponding to the message "during cleaning" which is visually displayed on the display 32. During the running of the tape in the cleaning cassette, a check is performed in step S9 to determined whether or not a specified time has elapsed. Such specified time is set to the permissible cleaning time for one use of the standard cleaning cassette, for example, a period of ten seconds. After the elapse of the specified time, the message or legend, "cleaning is finished" is generated in step S10 and is displayed on the display 32, whereupon, the cleaning cassette is ejected in step S5.

By way of summary, when a cleaning cassette without an MIC is loaded into the VTR, a check is performed in step S1 to see if the loaded cassette is a cleaning cassette or not based on the information contained in the ID board. If the loaded cassette is a cleaning cassette without an MIC, after the elapse of the specified permissible cleaning time, the cleaning cassette is ejected in the step S5. Thus, accidental use of the cleaning cassette for a long time, and consequent damage to the head or heads can be prevented.

Figure 11:
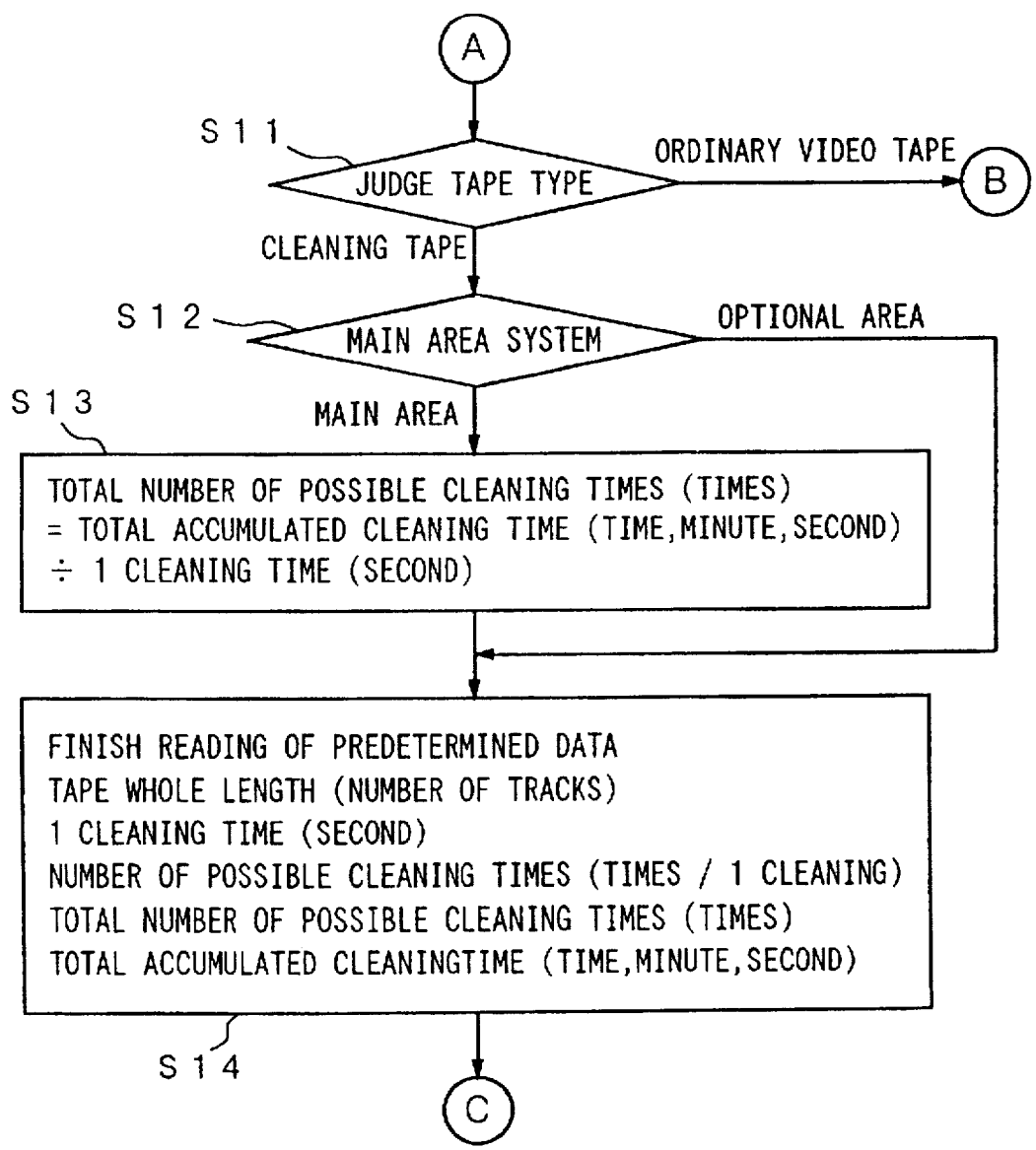

If it is judged in step S1 that the loaded cassette is a cassette having an MIC, the program proceeds to the routine shown on FIG. 11 where, in step S11, the tape type is judged from the information contained in the MIC. If it is judged in step S11 that the tape type does not indicate a cleaning cassette, that is, if an ordinary video tape cassette with an MIC has been loaded in the VTR, the routine returns to step S3 in FIG. 10 and ordinary operations of the VTR are executed.

On the other hand, if it is judged in step S11 that the tape type shown in the MIC indicates the presence of a cleaning cassette, a check is made in step S12 (FIG. 11) to determine whether or not information on the cleaning cassette also appears in the optional area. When information on the cleaning cassette exists only in the main area, the total number of possible cleaning times is obtained in step S13 by dividing the indicated total possible accumulated cleaning time by the indicated permissible cleaning time for each use of the cleaning cassette. Then, in step S14, the calculated total number of possible cleaning times is read along with the information obtained from the main area of the MIC and which indicates the tape length, the permissible time for one use of the cleaning cassette, the number of times the cleaning cassette may be used for one cleaning operation, the total accumulated cleaning time and the total possible accumulated cleaning time. When the pack shown in FIG. 9A exists in the optional area, the information on the total number of possible cleaning times (TPNC) is derived directly from the optional area. Therefore, if it is judged in step S12 that the information on the characteristics of the cleaning cassette also exists in the optional area, the program proceeds directly from step S12 to step S14 and the data mentioned previously as being obtained in that step is read. Thus, one way or the other, in step S14, information on the length of the tape, the permissible time for each use of the cleaning cassette, the permissible number of times the cleaning cassette may be used for each cleaning operation, the total possible number of cleaning times, the total accumulated number of times the cleaning cassette has been used, and the total possible accumulated cleaning time are fetched.

Figure 12:
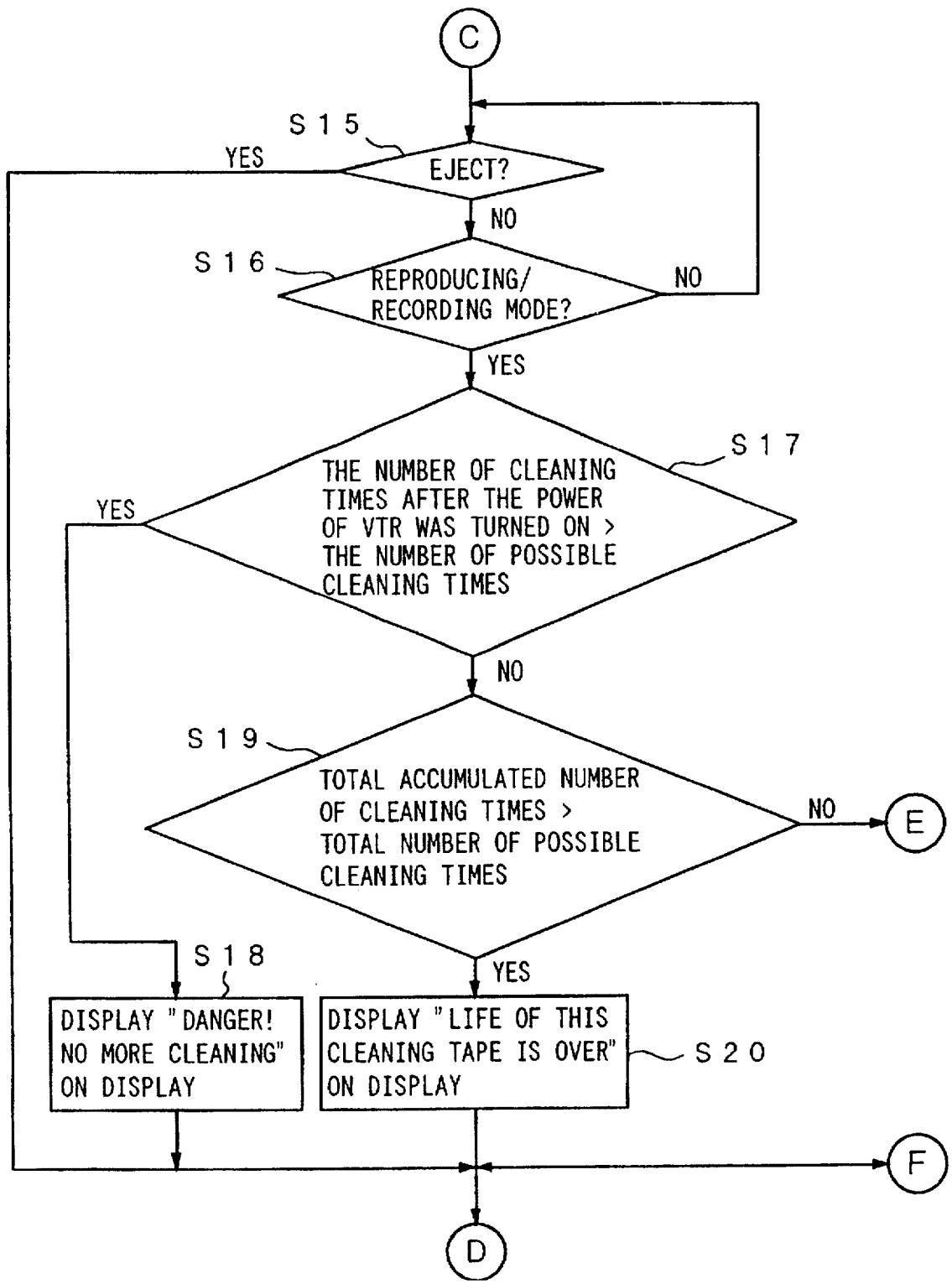

After such information has been fetched in step S14, the program proceeds to step S15 on FIG. 12 where a check is performed to determine whether or not the VTR has been set to its ejecting mode. If it is found in step S15 that the VTR has been set in its ejecting mode, the program returns to step S5 (FIG. 10) and the cassette is ejected.

If it is determined in step S15 that the VTR is not set in its ejecting mode, a check is performed in step S16 to determine if the VTR has been set in its reproducing or recording mode. If the VTR is found not to be set in its recording or reproducing mode, the processing routine is returned to S15. If the VTR is found to be set in its reproducing or recording mode in step S16, the program proceeds to step S17 where it is determined whether or not the number of times the cleaning cassette has been used after the VTR was turned ON has exceeded the possible number of times the cleaning cassette may be used for each cleaning operation. If the number of times the cleaning cassette has been used after turning ON the VTR is found in step S17 to exceed the permissible number of cleaning times for a cleaning operation, the legend "Danger! No more cleaning" is displayed at the display 32 in step S18. Further, the program returns from step S18 to step S5 and the cleaning cassette is ejected.

So long as the number of times the cleaning cassette has been used after turning ON the power to the VTR does not exceed the permissible number of cleaning times for one cleaning operation, the program proceeds from step S17 to S19 in which it is determined whether or not the total accumulated number of cleaning times exceeds the permissible total accumulated number of cleaning times. If it is found, in step S19, that the total accumulated number of cleaning times exceeds the permissible total accumulated number of cleaning times, the program proceeds to step S20 in which the legion "Life of this cleaning cassette is over" is displayed by display 32. The program returns from step S20 to step S5 in which the cleaning cassette is ejected.

Figure 13:
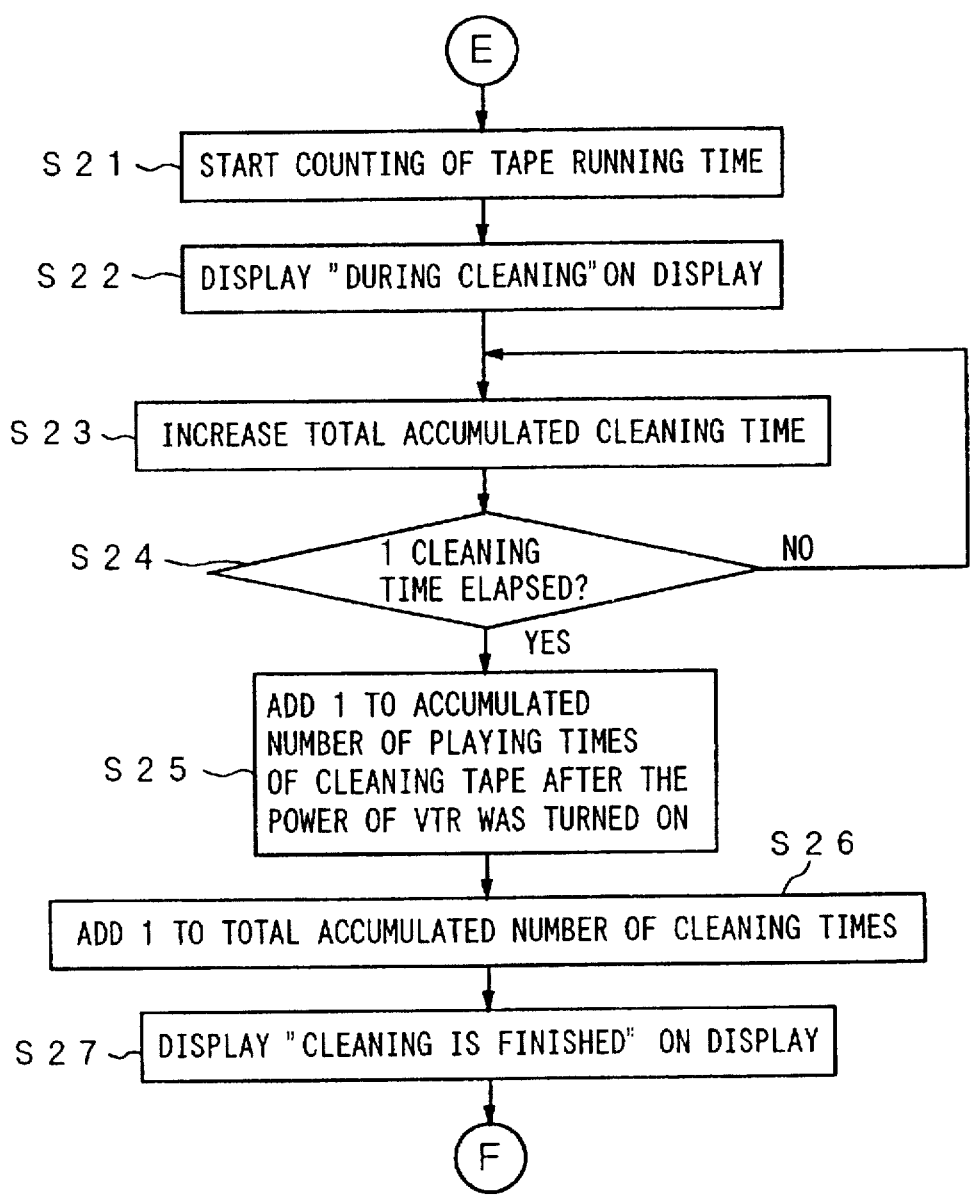

So long as the total accumulated number of cleaning times does not exceed the permissible total accumulated number of cleaning times, the program proceeds to the routine shown on FIG. 13 in which counting of the tape running time is started in step S21, the legend "During cleaning" is made to appear at display 32 in step S22, and the total accumulated cleaning time is progressively increased in step S23.

A continuing check is performed in step S24 to determined whether or not the permissible cleaning time for one use of the cleaning cassette has elapsed. So long as the cleaning time does not exceed the permissible cleaning time for one use of the cleaning cassette, the processing routine is returned to step S23 and the total accumulated cleaning time is increased progressively. However, when the permissible cleaning time for one use of the cleaning cassette has been found to have elapsed in step S24, the accumulated number of times the cleaning cassette has been used since turning ON the VTR is increased by "1" in step S25, and the total accumulated number of times the cleaning cassette has been used is also increased by 1 in step S26. The program proceeds from step 26 to 27 in which the legend "Cleaning is finished" is displayed on the display 32 and the program is returned to step S5 in which the cleaning cassette is ejected.

By way of summarizing the above, it will be seen that, when the cassette loaded into the VTR has an MIC, a check is made of the data in the MIC to determine therefrom whether or not the loaded cassette is a cleaning cassette. If the loaded cassette is a cleaning cassette the optimum cleaning time for each use of the cleaning cassette is obtained from data in the MIC. During a use of the cleaning cassette, if the optimum time of such use elapses, the cleaning cassette is ejected from the VTR. Further, during each use of the cleaning cassette, a check is performed to determine if the number of times the cleaning cassette has been used since the turning ON of the VTR exceeds the permissible number of such times of use for each cleaning operation, as also indicated by data in the MIC. Therefore, if the cleaning cassette is used an excessive number of times during a cleaning operation, that is, if the number of times the cleaning cassette is used after the turning ON of the VTR exceeds the permissible total number of times the cleaning cassette may be used for each cleaning operation, a suitable warning is displayed and the cleaning cassette is ejected from the VTR. Moreover, if the total accumulated number of times the cleaning cassette has been used is found to exceed the permissible total number of times the cleaning cassette may be used, as indicated by information in the MIC, a suitable warning is also displayed, and the cleaning cassette, having no further useful life, is ejected from the VTR. Thus, accidental use of a cleaning cassette for a long time, or when the useful life of the cassette has elapsed, is automatically avoided and consequent damage to the head or heads of the VTR can be prevented.

It is to be understood that, during the execution of a cleaning operation, the ejection of the cleaning cassette from the VTR is inhibited except in response to the circumstances described above with reference to FIGS. 10–13.

If desired, the residual amount of the cleaning tape, that is, the unused amount of cleaning tape in the cleaning cassette at any time, may be calculated by the controller 15 from information acquired from the MIC 12, whereupon the residual amount of the cleaning tape can be indicated by display 32. The residual amount of the cleaning cassette, at any time, can be calculated as follows:

If it is assumed that there are 10 tracks for one video frame, that the time or period of one frame is 1/30 second, and that the overall length of the cleaning tape (measured in the number of tracks thereon) is L, then the total possible cleaning time (in seconds) is obtained from the below equation (1).

Total possible cleaning time $= L \times (1/10) \times (1/30) + tm$ (1).

By subtracting the total accumulated cleaning time from the total possible cleaning time calculated above, the residual or remaining cleaning time can be readily obtained. The total accumulated cleaning time can be obtained by multiplying the cleaning time for one use of the cleaning cassette by the total accumulated number of times the cassette has been used.

The material employed for the cleaning tape in a cleaning cassette intended for an industrial use VTR differs from the cleaning tape in the cleaning cassette intended for a business use VTR and for a data streamer of a computer. Therefore, it is necessary to use such cleaning cassettes with the magnetic recording and reproducing apparatuses for which they are intended. The various kinds of cleaning cassettes can be identified by respective combinations of the tape grade and the tape type and in those cases where the cleaning cassette has an ID board, as on FIG. 3. In those cases where the cleaning cassettes have MICs, the kinds of cleaning cassettes can be identified by similar combinations of the tape grade and the tape type read from the respective BCID (FIG. 8) in a manner similar to the reading of such information from the ID board. In either case, by using such identifying information, it can be determined if a loaded cleaning cassette is a cleaning cassette for an industrial-use VTR, a cleaning cassette for a business-use VPR, or a cleaning cassette for the data streamer of a computer. In the event that the identified cleaning cassette is not intended for use in the VTR or other apparatus type in which it has been loaded, the controller 15 of such apparatus may respond thereto by causing the display 32 to provide a visual or other warning, and the controller 15 may further cause the mechanism 31 to eject the inappropriate cleaning cassette.

The previously mentioned visual displays of the legends "during cleaning", "cleaning is finished", "danger! No more cleaning" and "Life of this cleaning tape is over" by display 32 may be accompanied or replaced by suitably distinctive audible alarms for alerting the user to the corresponding conditions.

In the foregoing, the invention has been specifically described as applied to a VTR of the type in which a digital video signal is compressed prior to recording. However, the invention is not limited to use with a VTR of such type, but can also be applied to other recording and reproducing apparatuses. For example, the invention can also be applied to an analog 8 mm VTR, in which case five detection holes are selectively formed in the bottom surface of each cassette for the 8 mm VTR for identifying the tape type (MP, high-band MP or high-band ME) and the tape thickness (13 μmm, 10 μmm). Whether the loaded cassette is a cleaning cassette or not can be identified by selectively using the detection holes, of which two are reserved.

Having described specific preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic recording and reproducing apparatus for selectively having a normal cassette containing a recording and reproducing tape or a cleaning cassette containing a cleaning tape loaded therein, said apparatus comprising:

discriminating means for determining whether a cassette loaded into the apparatus is a normal cassette or a cleaning cassette; and control means for controlling operations of the apparatus in a manner such that, when said discriminating means determines that said cassette loaded into the apparatus is a cleaning cassette, a cleaning operation is performed for a predetermined time by the cleaning time in the loaded cleaning cassette;

wherein each of said normal and cleaning cassettes includes a respective storage means having information stored therein for indicating the respective cassette is said normal cassette or said cleaning cassette, and said discriminating means determines whether the cassette loaded into said recording and reproducing apparatus is a normal cassette or a cleaning cassette on the basis of said information stored in said storage means of the loaded cassette; said storage means of said cleaning cassette having further information stored therein for respectively indicating a predetermined time the respective cleaning cassette may be used during each use thereof, the number of times the respective cleaning cassette may be used during one cleaning operation, a total accumulated cleaning time during which said respective cleaning cassette has been used and a total possible cleaning time during which said respective cleaning cassette may be used; said control means responding to said further information in said storage means for aborting a cleaning operation by said respective cleaning cassette when the latter has been in use for said predetermined time, when said number of times the respective cleaning cassette may be used during said one cleaning operation is exceeded, or when said total accumulated cleaning time during which said respective cleaning cassette has been used exceeds said total possible cleaning time for said respective cleaning cassette.

* * * * *